United States Patent [19]

Ohmura

[11] Patent Number: 4,976,328
[45] Date of Patent: Dec. 11, 1990

[54] REAR WHEEL TURNING SYSTEM

[75] Inventor: Hiroshi Ohmura, Hiroshima, Japan

[73] Assignee: Mazda Motor Corporation, Hiroshima, Japan

[21] Appl. No.: 334,191

[22] Filed: Apr. 6, 1989

[30] Foreign Application Priority Data

| Apr. 11, 1988 | [JP] | Japan | 63-88457 |
| Apr. 15, 1988 | [JP] | Japan | 63-93076 |
| Apr. 22, 1988 | [JP] | Japan | 63-99746 |

[51] Int. Cl.$^5$ ............................................. B62D 5/04
[52] U.S. Cl. ................................ 180/140; 180/79.1; 280/91
[58] Field of Search .............. 180/140, 142, 79.1; 280/91

[56] References Cited

U.S. PATENT DOCUMENTS

| 4,645,025 | 2/1987 | Ohe et al. | 180/79.1 |
| 4,782,907 | 11/1988 | Morishita et al. | 180/140 |
| 4,837,690 | 6/1989 | Morishita et al. | 180/79.1 X |
| 4,854,410 | 8/1989 | Kanazawa et al. | 180/142 X |

FOREIGN PATENT DOCUMENTS

| 0218283 | 9/1987 | Japan | 180/142 |
| 62-25277 | 12/1987 | Japan . | |
| 88/04251 | 6/1988 | PCT Int'l Appl. | 180/79.1 |

Primary Examiner—Charles A. Marmor
Assistant Examiner—Mitchell Bompey
Attorney, Agent, or Firm—Sixbey, Friedman, Leedom & Ferguson

[57] ABSTRACT

A rear wheel turning mechanism of a four wheel steering system includes a rear wheel turning rod which is connected to the rear wheels of the vehicle and is adapted to be displaced so as to turn the rear wheels. An electric motor is operatively connected to the rear wheel turning rod and the steering wheel so as to displace the rear wheel turning rod, which turns the rear wheels in response to the operation of the steering wheel. A rear-wheel-neutralizing spring urges the rear wheel turning rod to the neutral position in which the rear wheels are held in the straight-ahead position. A clutch is interposed between the electric motor and the rear wheel turning rod and is adapted to disconnect the latter from the former to permit the latter to return to the neutral position under the force of the rear-wheel-neutralizing means.

36 Claims, 16 Drawing Sheets

F I G. 16A
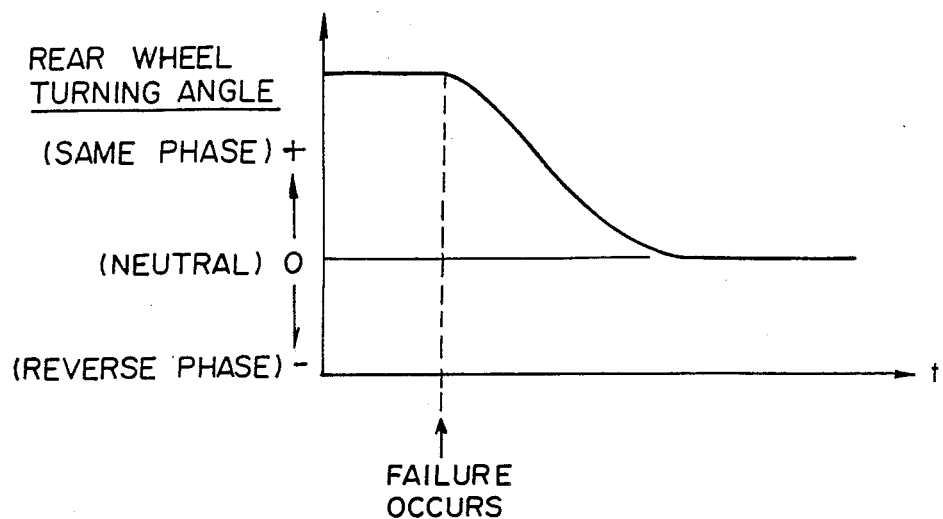
F I G. 16B
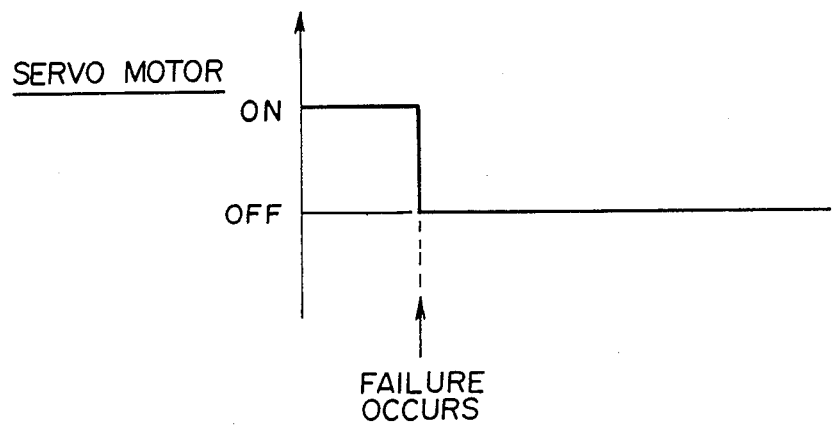

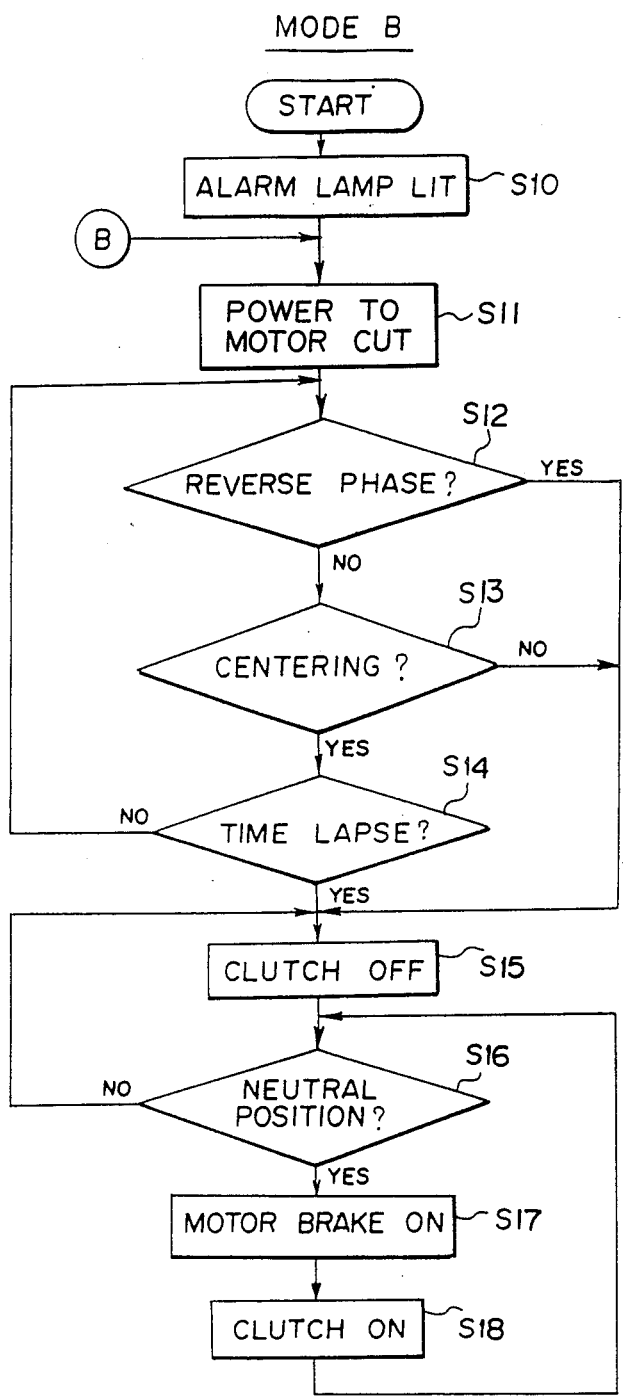

F I G . 18
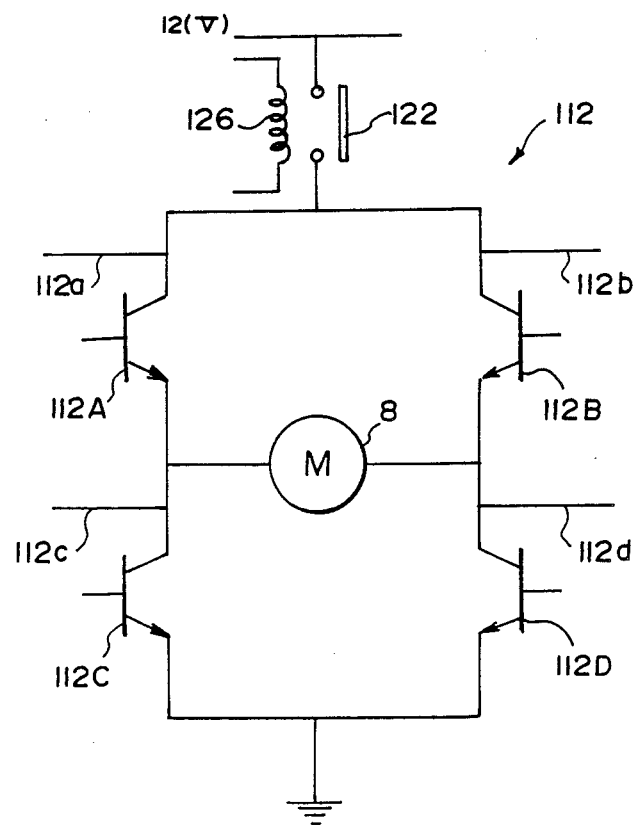

REAR WHEEL TURNING SYSTEM

BACKGROUND OF THE INVENTION

1. Field of the Invention

This invention relates to a rear wheel turning system for turning rear wheels of a vehicle in response to the operation of a steering wheel.

2. Description of the Prior Art

There has been known a four-wheel steering system for a vehicle in which not only the front wheels but also the rear wheels are turned in response to the operation of the steering wheel.

The four wheel steering system generally comprises a front wheel turning mechanism for turning the front wheels and a rear wheel turning mechanism for turning the rear wheels which are mechanically or electrically connected to each other. In the four wheel steering system of the latter type, the rear wheel turning mechanism is driven by an electric motor which is operatively connected to the steering wheel as disclosed in U.S. Pat. No. 4,645,025.

As disclosed in the United States patent, it has been proposed to provide the rear wheel turning mechanism with a rear-wheel-neutralizing means which normally urges the rear wheel turning mechanism to the neutral position in which it holds the rear wheels in the straight-ahead position. The rear-wheel-neutralizing means functions as a fail-safe mechanism which returns the rear wheels to the straight-ahead position and holds them there in case the control system fails.

For such motor-driven rear wheel turning mechanisms, a motor brake is generally provided for the electric motor in order to enhance the holding torque, and a reduction train is generally interposed between the electric motor and the rear wheel turning mechanism in order to allow a smaller electric motor to be used. Accordingly, in order to return the rear wheels to the straight-ahead position, the rear-wheel-neutralizing means must overcome the holding torque of the electric motor which is transmitted thereto by way of the reduction train, and therefore, it is very difficult for the rear-wheel-neutralizing means to actually return the rear wheels to the straight-ahead position and held them there.

SUMMARY OF THE INVENTION

In view of the foregoing observations and description, the primary object of the present invention is to provide a rear wheel turning system which can certainly return the rear wheels to the straight-ahead position and hold them there in case the rear wheel turning system fails.

The rear wheel turning system in accordance with the present invention comprises a rear wheel turning means which is connected to the rear wheels of the vehicle and is adapted to be displaced to turn the rear wheels, an electric motor which is operatively connected to the rear wheel turning means and the steering wheel to displace the rear wheel turning means to turn the rear wheels in response to the operation of the steering wheel, a rear-wheel-neutralizing means which urges the rear wheel turning means to the neutral position in which the rear wheels are held in the straight-ahead position, and a clutch means which is interposed between the electric motor and the rear wheel turning means and is adapted to disconnect the latter from the former to permit the latter to return to the neutral position under the force of the rear-wheel-neutralizing means.

BRIEF DESCRIPTION OF THE DRAWINGS

FIG. 17 is a flow chart similar to the one in FIG. 11 but for illustrating another modification of the measure mode B and, FIG. 18 is a view showing the motor driving circuit employed in the modification shown in FIG. 17.

DESCRIPTION OF THE PREFERRED EMBODIMENTS

Figure 1:
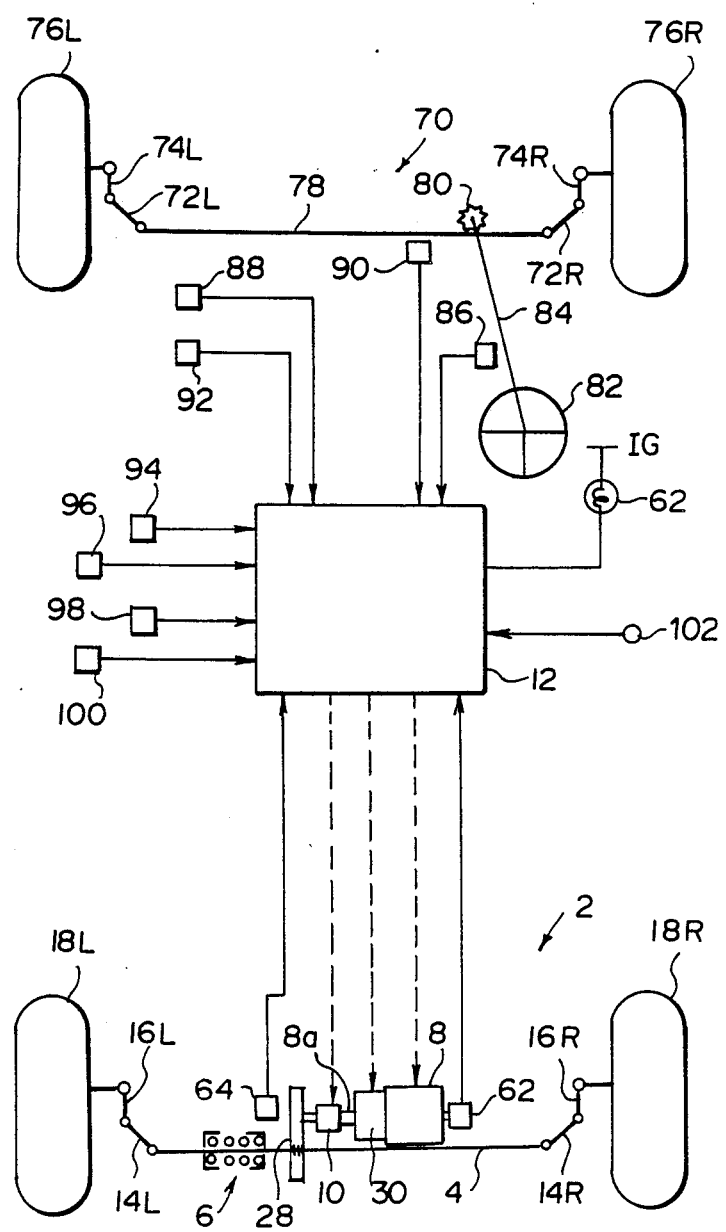
FIG. 1 is a schematic plan view of a four wheel steering system with a rear wheel turning system in accordance with an embodiment of the present invention.

In FIG. 1, a four-wheel steered vehicle is provided with a front wheel turning mechanism 70 and a rear wheel turning mechanism 2 in accordance with an embodiment of the present invention. The rear wheel turning mechanism 2 comprises a rear wheel turning rod 4, a rear-wheel-neutralizing mechanism 6, a servomotor 8, a clutch 10 and a control unit 12.

The rear wheel turning rod 4 is disposed so as to extend in the transverse direction of the vehicle body. A left rear wheel 18L is connected to the left end of the rear wheel turning rod 4 by way of a knuckle arm 16L and a tie rod 14L, and a right rear wheel 18R is connected to the right end of the rear wheel turning rod 4 by way of a knuckle arm 16R and a tie rod 14R so that the left and right rear wheels 18L and 18R are turned in response to displacement of the rear wheel turning rod 4 in the transverse direction of the vehicle body.

Figure 3:
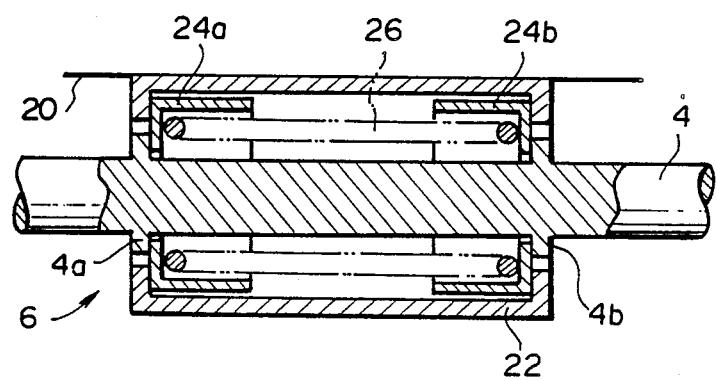
FIG. 3 is a cross-sectional view showing the rear-wheel-neutralizing mechanism employed in the embodiment.

The rear-wheel-neutralizing mechanism 6 includes a casing 22 fixed to the vehicle body 20 as shown in FIG. 3. A pair of spring retainers 24a and 24b are slidably fitted into the casing 22, and a compression spring 26 is disposed between the spring retainers 24a and 24b. The rear wheel turning rod 4 extends through the casing 22 and through the compression spring 26. The rear wheel turning rod 4 is provided with a pair of collar portions 4a and 4b formed thereon spaced from each other in the longitudinal direction thereof. The spring retainers 24a and 24b respectively abut against the collar portions 4a and 4b, whereby the rear wheel turning rod 4 is urged by the spring 26 to the neutral position in which the rear wheels 18L and 18R are held in the straight-ahead position (the position in which the turning angle of the rear wheels is 0). The compression spring 26 has a spring force which can overcome the maximum side force acting on the rear wheel turning rod 4 during cornering.

Figure 2:
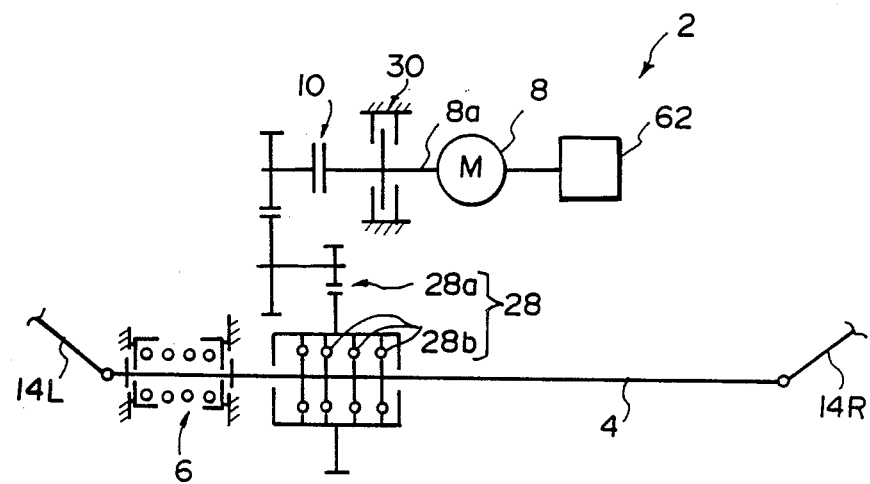
FIG. 2 is a schematic view showing a part of the rear wheel turning system.

The servomotor 8 is a stepping motor, and as shown in FIG. 2, has an output shaft 8a which is connected to the rear wheel turning rod 4 by way of a reduction train 28 comprising a gear train 28a and ball screws 28b. The servomotor 8 is controlled by a control signal from the control unit 12 so as to displace the rear wheel turning rod 4 from the neutral position, overcoming the force of the rear-wheel-neutralizing mechanism 6. The output shaft 8a of the servomotor 8 is provided with a brake 30 which brakes the rotation of the output shaft 8a. The brake 30 holds the rear wheel turning rod 4 in a predetermined position by locking the output shaft 8a of the servomotor 8 under the control of the control unit 12.

The clutch 10 is interposed between the output shaft 8a of the servomotor 8 and the gear train 28a and disengages the rear wheel turning rod 4 from the servomotor 8 under the control of the control unit 12 in case the system fails as will be described in detail later, thereby permitting the rear wheel turning rod 4 to return to the neutral position under the force of the rear-wheel-neutralizing mechanism 6.

Figure 4:
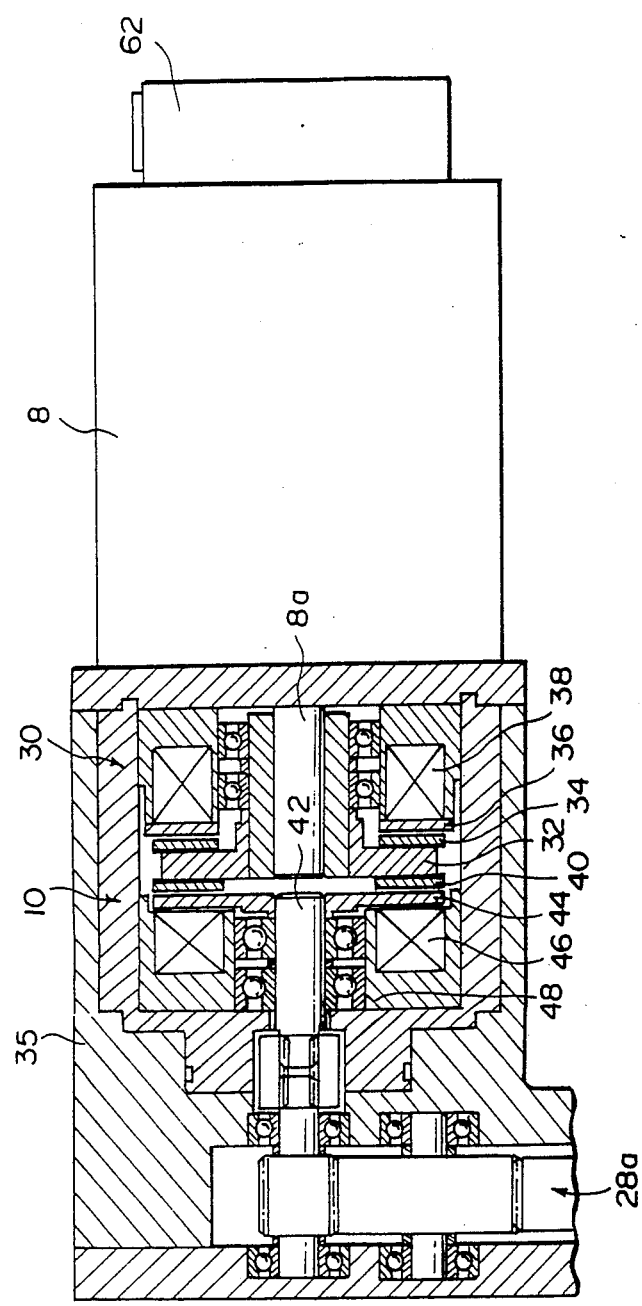
FIG. 4 is a cross-sectional view showing the brake and clutches employed in the embodiment.

FIG. 4 shows in detail the brake 30 and the clutch 10.

As shown in FIG. 4, the brake 30 comprises a ring plate 34 having a plurality of radial grooves which are adapted mesh with a plurality of radial grooves formed on the servomotor side surface of a disk 32 fixed to the output shaft 8a of the servomotor 8, and a solenoid 38 which pulls the ring plate 34 against an attracting plate 36 fixed to a casing 35. The disk 32 is also provided with a plurality of radial grooves on the other surface. When the solenoid 38 is not energized, the ring plate 34 freely rotates together with the disk 32. On the other hand, when the solenoid 38 is energized, the ring plate 34 is pulled against the attracting plate 36 with the ring plate 34 in mesh with the disk 32 and accordingly, rotation of the output shaft 8a of the servomotor 8 is braked.

The clutch 10 comprises a ring plate 40 having a plurality of radial grooves adapted to mesh with the radial grooves on the surface of the disk 32 opposite to the surface facing the ring plate 34 of the brake 30, and a solenoid 46 which pulls the ring plate 40 against a disk 44 fixed to a rotational shaft 42. The rotational shaft 42 is coaxial with the output shaft 8a. When the solenoid 46 is not energized, the ring plate 40 is disengaged from the disk 44, and on the other hand, when the solenoid 46 is energized, the ring plate 40 is engaged with the disk 44 to operatively connect the rotational shaft 42 to the output shaft 8a of the servomotor 8. The ring plate 40 is constantly engaged with the disk 32. Accordingly, the rotation of the output shaft 8a of the servomotor 8 is transmitted to the gear train 28a when the brake 30 is released and the clutch 10 is engaged. Normally, the brake 30 is released, and the clutch 10 is engaged to transmit the driving force of the servomotor 8 to rear wheel turning rod 4.

The control unit 12 shown in FIG. 1 controls the rear wheel turning mechanism 2 and the front wheel turning mechanism 70 according to the running condition of the vehicle on the basis of predetermined four-wheel steering characteristics.

The front wheel turning mechanism 70 comprises a front wheel turning rod 78 provided with a rack (not shown in FIG. 1) in mesh with a pinion 80 on the lower end of a steering shaft 84. A steering wheel 82 is mounted on the upper end of the steering shaft 84. A left front wheel 76L is connected to the left end of the front wheel turning rod 78 by way of a left tie rod 72L and a left knuckle arm 74L, and a right front wheel 76R is connected to the right end of the front wheel turning rod 78 by way of a right tie rod 72R and a right knuckle arm 74R. When the steering wheel 82 is rotated, the front wheel turning rod 78 is displaced in the transverse direction of the vehicle body to turn the front wheels 76L and 76R.

Figure 5:
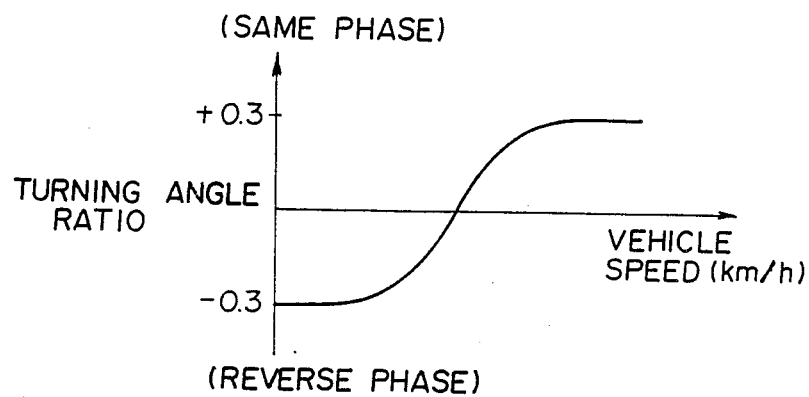
FIGS. 5 and 6 illustrate the operation of the four wheel steering system shown in FIG. 1.
Figure 6:
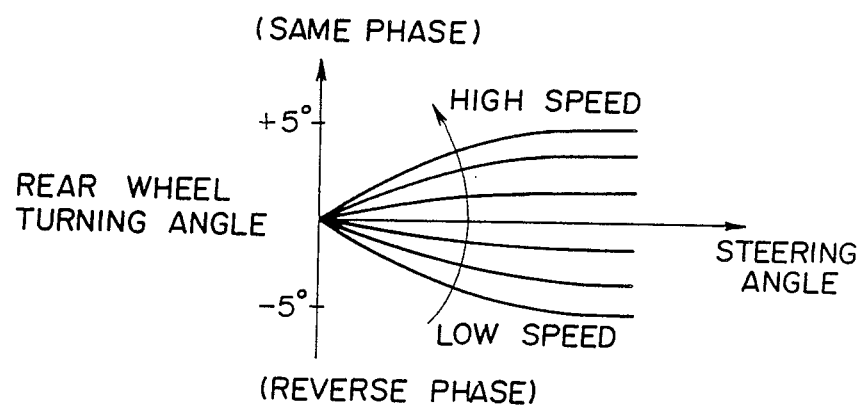

In this embodiment, the control unit 12 controls the rear wheel turning mechanism 2 so that the rear wheel turning angle ratio, i.e., the ratio of the turning angle of the rear wheels to the ratio of the turning angle of the front wheels, is changed according to the vehicle speed and the turning angle of the steering wheel 82 on the basis of the four-wheel steering characteristics shown in FIGS. 5 and 6. In FIGS. 5 and 6, the rear wheel turning angle ratio is defined to be positive when the rear wheels are turned in the same direction as the front wheels (same phase) and to be negative when the rear wheels are turned in the direction opposite to that of the front wheels (reverse phase).

The control unit 12 receives signals from a steering angle sensor 86, a vehicle speed sensor 88 and a rotary encoder 62 which detects the angular position of the servomotor 8, and determines a target rear wheel turning angle on the basis of the steering angle (equivalent to the front wheel turning angle) and the vehicle speed. Then the control unit 12 outputs to the servomotor 8 a control signal representing the amount by which the rear wheels are to be turned, and the rotary encoder 62 watches whether the servomotor 8 is correctly operated.

The control system of the four wheel steering system of this vehicle is doubly arranged for the purpose of safety. That is, a front wheel turning angle sensor 90 is provided in addition to the steering angle sensor 86, and a second vehicle speed sensor 92 is provided in addition to the vehicle speed sensor 88. Further, a rear wheel turning angle sensor 64 which detects the mechanical displacement of a member operatively spaced from the clutch 10 toward the rear wheel turning rod 4 operates in addition to the rotary encoder 62. The rear wheels 18L and 18R are turned only when both the sensor in each of the three sensor-sensor pairs detect values conforming to each other. For example, when the value of the vehicle speed detected by the first vehicle speed sensor 88 differs from that detected by the second vehicle speed sensor 92, it is determined that a failure has occurred and a fail mode control (to be described in detail later) is accomplished to hold the rear wheels 18L and 18R in the straight-ahead position.

A neutral switch 94, an inhibitor switch 96, a brake switch 98 and an engine switch 100 are connected to the control unit 12. The neutral switch 94 outputs an OFF signal when the gearshift lever is in neutral or the clutch pedal is depressed and otherwise outputs an ON signal. The neutral switch 94 is disconnected when the four wheel steering system is incorporated in an automatic transmission vehicle. The inhibitor switch 96 outputs an ON signal when the selector lever is in N or P and otherwise outputs an OFF signal. The inhibitor switch 96 is disconnected when the four wheel steering system is incorporated in a manual transmission vehicle. The brake switch 98 outputs an ON signal when the brake pedal is depressed, and the engine switch 100 outputs an ON signal when the engine is running. A signal representing whether an alternator (not shown) is generating electricity is input into the control unit 12 from an L terminal 102 of the alternator.

Figure 7:
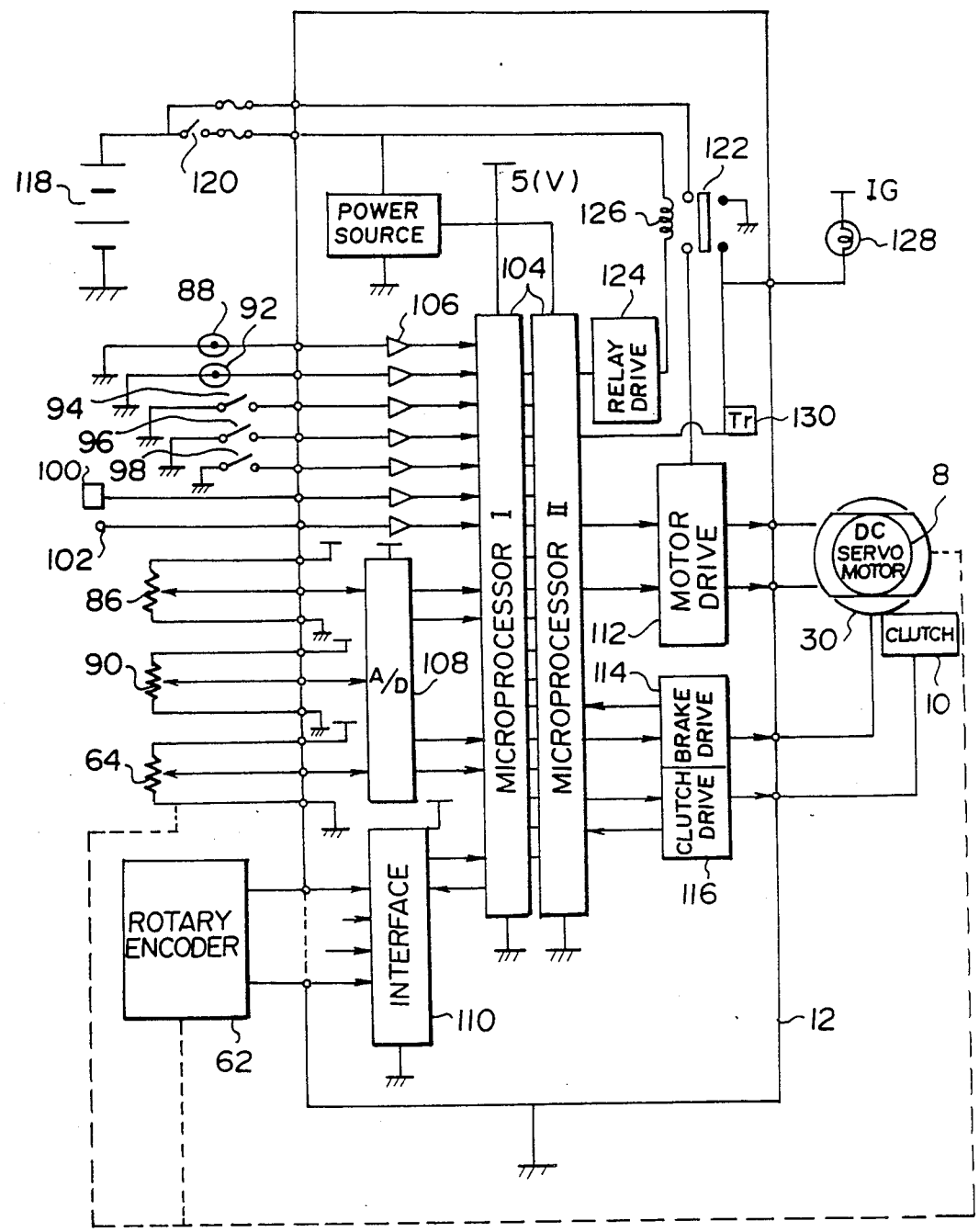
FIG. 7 is a block diagram showing the control unit employed in the embodiment.

As shown in FIG. 7, the control unit 12 has a double microprocessor 104 comprising microprocessors I and II. The signals from the vehicle speed sensors 88 and 92, the switches 94, 96, 98 and 100, and the L-terminal 102 of the alternator are input into the microprocessor 104 by way of buffers 106. The signals from the sensors 86, 90 and 64 are input into the microprocessor 104 by way of an A/D convertor 108, and the signal from the rotary encoder 62 is input into the microprocessor 104 by way of an interface 110. The microprocessor 104 generates signals and delivers them to the servomotor 8, the brake 30 and the clutch 10 respectively by way of a motor driving circuit 112, a brake driving circuit 114 and a clutch driving circuit 116. The control of the turning of the rear wheels is begun when the signal from the L-terminal 102 of the alternator turns high. Reference numerals 118 and 120 in FIG. 7 respectively denote a battery and an ignition switch, and reference numeral 122 denotes a relay having a relay winding 126. The relay winding 126 is connected between the ignition switch 120 and a relay driving circuit 124 which is connected to the microprocessor 104. As will be described later, when a predetermined failure occurs and the relay driving circuit 124 de-energizes the relay winding 126, the motor driving circuit 112 is disconnected from the battery 118 and an alarm lamp 128 is lit. When a failure other than the predetermined failure occurs, the microprocessor 104 provides a current to the base of a transistor 130 to light the alarm lamp 128.

Failures which can occur in the four wheel steering system and measures for the failures will be described, hereinbelow.

In this particular embodiment, measure mode A or measure mode B is taken according to the kind of failure which occurs.

The measure mode A is taken in the case of a failure such as one that permits turning of the rear wheels 18L and 18R and detection of the position of the rear wheels 18L and 18R. (Such a failure will be referred to as "a first mode failure", hereinbelow.) In the measure mode A, the alarm lamp 128 is lit, the servomotor 8 is energized to return the rear wheel turning rod 4 to the neutral position, and then the brake 30 is applied.

The measure mode B is taken in the case of a failure such as one that disables the control of the rear wheels 18L and 18R and the detection of the position of the rear wheels 18L and 18R. (Such a failure will be referred to as "a second mode failure", hereinbelow.) In the measure mode B, the alarm lamp 128 is lit, the brake 30 is applied, the servomotor 8 is de-energized, the clutch 10 is released so that the rear wheel turning rod 4 is disconnected from the servomotor 8, the return of the rear wheel turning rod 4 to the neutral position under the force of the spring 26 of the rear-wheel-neutralizing mechanism 6 is waited for and the clutch 10 is subsequently engaged to connect the rear wheel turning rod 4 to the servomotor 8.

Figure 8A:
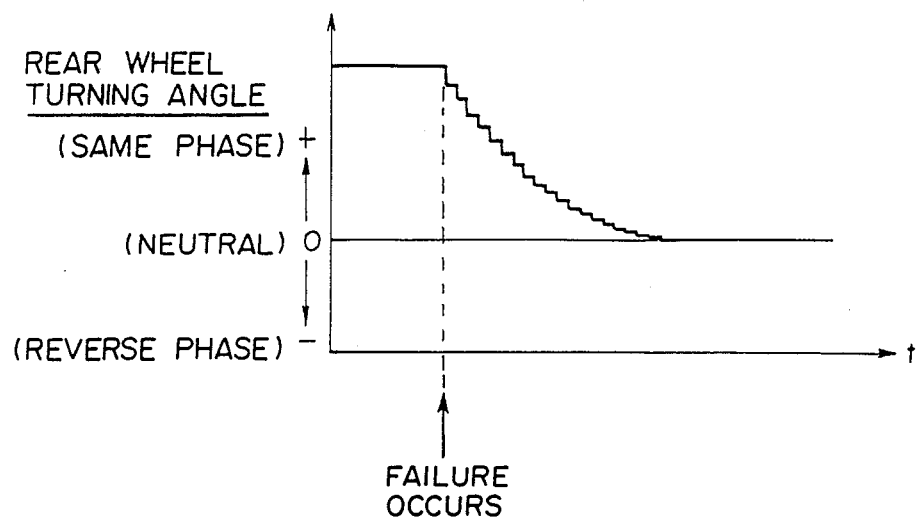
FIGS. 8A and 8B illustrate the control of the clutch in the embodiment.
Figure 8B:
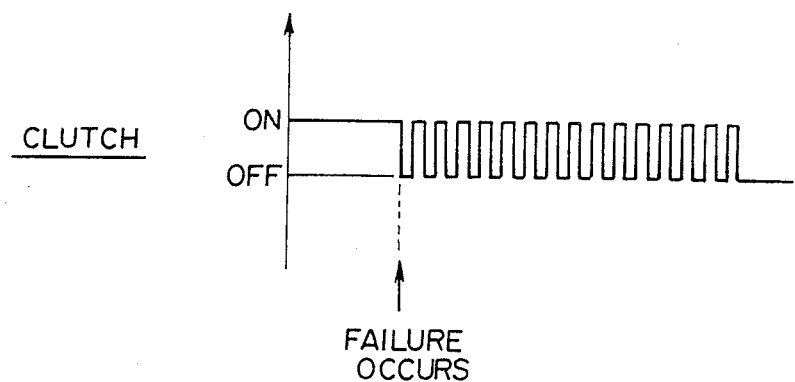

When the clutch 10 is abruptly released in the measure mode B, the rear wheel turning rod 4 will quickly return to the neutral position under the force of the spring 26. If the rear wheel turning rod 4 quickly returns to the neutral position while the front wheels 76L and 76R and the rear wheels 18L and 18R are turned in the same direction (the same phase), the attitude of the vehicle can be adversely affected. Accordingly, in this particular embodiment, the control unit 12 controls the clutch 10 so that the rear wheel turning rod 4 gradually returns to the neutral position. That is, as shown in FIGS. 8A and 8B, the control unit 12 repeatedly alternates between releasing and engaging the clutch 10 for a predetermined time interval, thereby gradually returning the rear wheel turning rod 4 to the neutral position.

Failure of the system which detects the vehicle speed

A failure in the system which detects the vehicle speed belongs to the first mode failure, and when it is determined that a failure occurs in this system in the following manner, the measure mode A is taken.

(1) Failure of the first vehicle speed sensor 88

When the output of the first vehicle speed sensor 88 represents a deceleration of the vehicle larger than a predetermined value a, that is, when $|dV1/dt|>a$(constant) (wherein V1 represents the vehicle speed detected by the first vehicle speed sensor 88) while the brake switch 98 outputs the OFF signal (representing that the brake is not applied), it is determined that the first vehicle speed sensor 88 has failed, and the measure mode A is taken.

(2) Failure of the second vehicle speed sensor 92

When the output of the second vehicle speed sensor 92 represents a deceleration of the vehicle larger than the predetermined value a, that is, when $|dV2/dt|>a$ (constant) (wherein V2 represents the vehicle speed detected by the second vehicle speed sensor 92) while the brake switch 98 outputs the OFF signal (representing that the brake is not applied), it is determined that the second vehicle speed sensor 92 has failed, and the measure mode A is taken.

(3) Failure of the first vehicle speed sensor 88 and/or the second vehicle speed sensor 92

When the outputs of the first and second vehicle speed sensors 88 and 92 differ from each other by a predetermined value b, that is, when $|V1-V2|>b$(constant), it is determined that at least one of the first and second vehicle speed sensors 88 and 92 has failed, and the measure mode A is taken.

(4) Failure of both the first and second vehicle speed sensors 88 and 92

When the signal from the L-terminal 102 of the alternator is high, the outputs V1 and V2 of the first and second vehicle speed sensors 88 and 92 are both 0 (V1=V2=0), and the signal from the neutral switch 94, continues to be ON for a predetermined time interval (in the case where a four wheel steering system is incorporated in a manual transmission vehicle), or when the signal from the L-terminal 102 of the alternator is high, the outputs V1 and V2 of the first and second vehicle speed sensors 88 and 92 are both 0 (V1=V2=0), the signal from the inhibitor switch 96 is OFF, the signal from the engine switch 100 is ON, and the signal from the brake switch 98 continues to be OFF for a predetermined time interval (in the case where a four wheel steering system is incorporated in an automatic transmission vehicle), it is determined that both the first and second vehicle speed sensors 88 and 92 have failed, and the measure mode A is taken.

That is, when the engine speed is sufficient to run the vehicle and the position of the gearshift lever or the selector lever indicates that the vehicle is to be run, and both the outputs of the first and second vehicle speed sensors 88 and 92 still represent that the vehicle speed is 0, it is determined that both the first and second vehicle speed sensors 88 and 92 have simultaneously failed.

Failure of the rear wheel turning system

A failure in the rear wheel turning system belongs to the second mode failure, and when it is determined that a failure occurs in this system in the following manner, the measure mode B is taken.

(1) When it is determined that the output EN of the rotary encoder 62 does not conform to the output (the rear wheel turning angle θR) of the rear wheel turning angle sensor 64, e.g., when $|f(EN)-G(\theta R)|>C$ (constant), it is determined that the rear wheel turning mechanism 2 is not being correctly operated, and the measure mode B is taken.

(2) When it is determined that the output (the rear wheel turning angle θR) of the rear wheel turning angle sensor 64 does not conform to the target rear wheel turning angle θr set by the control unit 12, e.g., when $|\theta r-\theta R|>C$ (constant), it is determined that the rear wheel turning mechanism 2 is not being correctly operated, and the measure mode B is taken.

(3) When it is determined that the reference position of the rear wheels cannot be found upon initialization of the system which takes place when the engine switch 100 is turned ON, it is determined that the rear wheel turning mechanism 2 cannot be correctly operated, and the measure mode B is taken.

Failure of the servomotor system

A failure in the servomotor system belongs to the second mode failure, and when it is determined that a failure occurs in this system in the following manner, the measure mode B is taken.

(1) When it is determined that the rotation of the servomotor 8 (the value detected by the encoder 62) does not conform to the controlled variable, it is determined that the rear wheel turning mechanism 2 cannot be correctly operated and the measure mode B is taken.

(2) When it is determined that the winding of the servomotor 8 shortcircuits or is broken, the harness shortcircuits or is broken or the motor driving circuit 112 fails, it is determined that the rear wheel turning mechanism 2 cannot be correctly operated and the measure mode B is taken.

Failure of the system which detects the rear wheel turning angle

A failure in the system which detects the rear wheel turning angle belongs to the second mode failure, and when it is determined that a failure occurs in this system in the following manner, the measure mode B is taken.

(1) When it is determined that the codes output from the rotary encoder 62 are abnormal, the measure mode B is taken.

(2) When it is determined that the output of the rear wheel turning angle sensor 64 exceeds a preset range, it is determined that the rear wheel turning angle sensor 64 has failed, and the measure mode B is taken.

Failure of the system which detects the front wheel turning angle

A failure in the system which detects the rear wheel turning angle belongs to the first mode failure, and when it is determined that a failure occurs in this system in the following manner, the measure mode A is taken.

(1) When it is determined that the output of the steering angle sensor 86 exceeds a preset range, it is determined that the steering angle sensor 86 has failed, and the measure mode A is taken.

(2) When it is determined that the output of the front wheel turning angle sensor 90 exceeds a preset range, it is determined that the front wheel turning angle sensor 90 has failed, and the measure mode A is taken.

(3) When it is determined that the difference between the outputs of the steering angle sensor 86 and the front wheel turning angle sensor 90 exceeds a predetermined value, it is determined that at least one of the steering angle sensor 86 and the front wheel turning angle sensor 90 has failed, and the measure mode A is taken.

Failure of the clutch

When it is determined that the clutch 10 cannot be correctly disengaged, the measure mode A is taken.

If the output of the rear wheel turning angle sensor 64 changes by an amount larger than a predetermined value when the control unit 12 causes the motor driving circuit 112 to energize the servomotor 8 and causes the clutch driving circuit 116 to disengage the clutch 10, it is determined that the clutch 10 cannot be correctly disengaged.

Failure of the control unit

A failure of the control unit belongs to the second mode failure, and when it is determined that a failure occurs in this system in the following manner, the measure mode B is taken.

(1) When an abnormality is found in a read/write check performed on the RAM, the measure mode B is taken.

(2) When an abnormality is found in a damn/sum check performed on the ROM, the measure mode B is taken.

(3) When an abnormality is found in an initial check performed on the free running counter, the measure mode B is taken.

(4) When an abnormality is found in an I/0 check performed on the A/D convertor 108, the measure mode B is taken.

Failure of the microprocessor (1) When it is determined that results of arithmetic operations performed by the microprocessors I and II do not conform to each other, the measure mode B is taken.

(2) When it is determined that intercommunication between the microprocessors I and II is disabled, the measure mode B is taken.

Failure of the brake

A failure of the brake 30 belongs to the second mode failure, and when it is determined that a failure occurs in this system in the following manner, the measure mode B is taken.

(1) If the rotary encoder 62 and the rear wheel turning angle sensor 64 generate no output (i.e., the rear wheels 18L and 18R are not turned) even when the control unit 12 causes the motor driving circuit 112 to energize the servomotor 8 with the brake 30 released, it is determined that the output shaft 8a of the servomotor 8 has been kept locked by the brake 30, and the measure mode B is taken.

(2) If the rotary encoder 62 and the rear wheel turning angle sensor 64 generate outputs (i.e., the rear wheels 18L and 18R are turned) even when the control unit 12 causes the motor driving circuit 112 to energize the servomotor 8 with the brake 30 applied, it is determined that the output shaft 8a of the servomotor 8 cannot be locked by the brake 30, and the measure mode B is taken.

Figure 9:
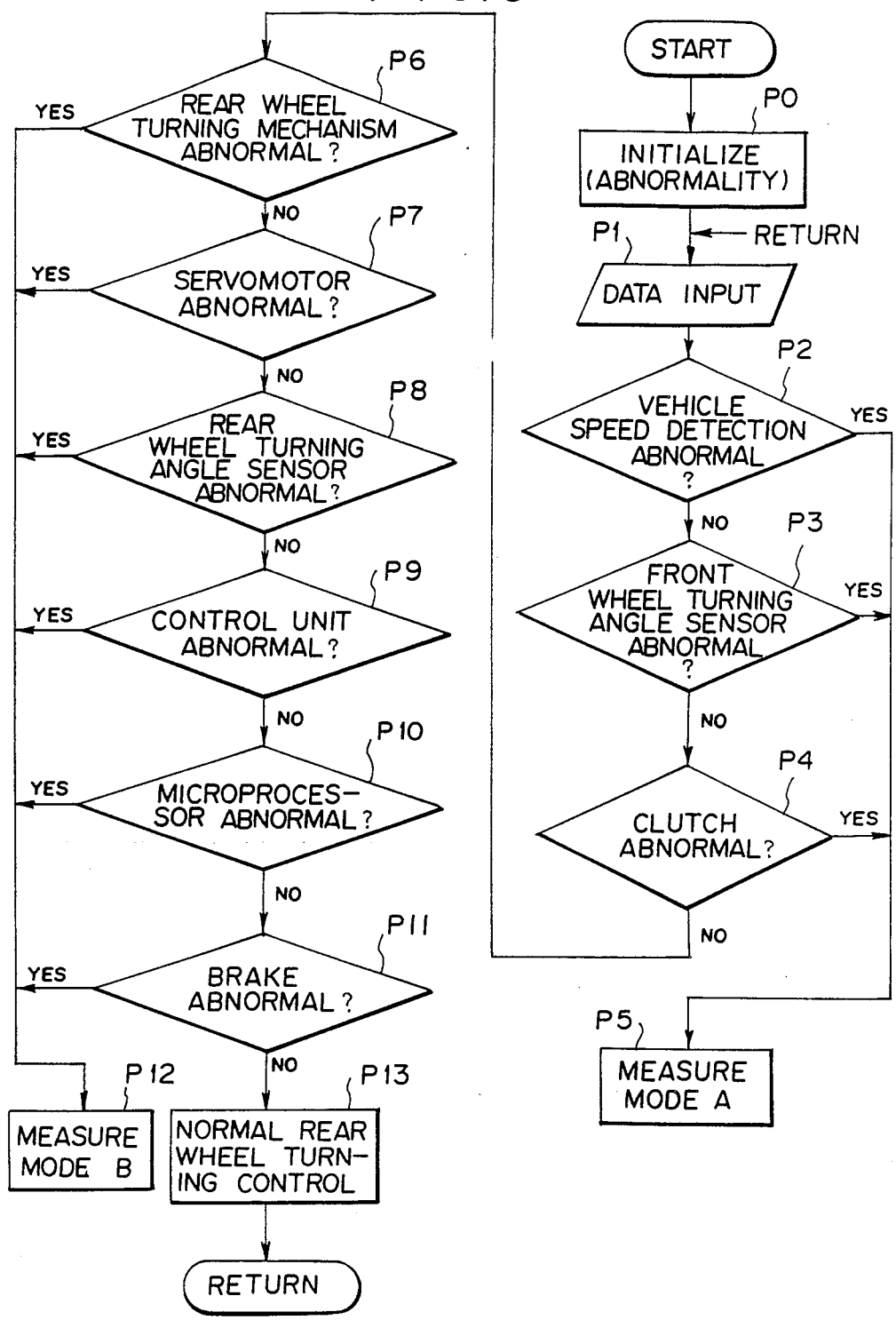
FIGS. 9 to 11 are flow charts showing the operation of the control unit.

FIG. 9 shows a flow chart which illustrates the operation of the control unit 12 for taking desired measures in case of a failure in the four wheel steering system.

As shown in FIG. 9, the control unit 12 initializes the system in step P0. In step P0, the control unit 12 detects any abnormalities in the initialization stage, e.g., whether the reference position of the rear wheels can be found, and whether the ROM and the RAM of the control unit 12 are normal.

In the next step P1, signals from the aforesaid switches and the sensors are input into the control unit 12. Then it is determined in step P2 whether the system which detects the vehicle speed is abnormal. It is determined in step P3 whether the system which detects the front wheel turning angle is abnormal, and it is determined in step P4 whether the clutch 10 is abnormal. When it is determined that the system which detects the vehicle speed, the system which detects the front wheel turning angle or the clutch 10 is abnormal, the control unit 12 proceeds to step P5 and takes the measure mode A.

Otherwise, the control unit 12 proceeds to step P6 and determines whether the rear wheel turning system is abnormal (step P6), whether the servomotor 8 is abnormal (step P7), whether the system which detects the rear wheel turning angle is abnormal (step P8), whether the control unit 12 is abnormal (step P9), whether the microprocessor is abnormal (step P10), and whether the brake 30 is abnormal (step P11). When it is determined that the rear wheel turning system is abnormal, the servomotor 8 is abnormal, the system which detects the rear wheel turning angle is abnormal, the control unit 12 is abnormal, the microprocessor is abnormal, or the brake 30 is abnormal, the control unit 12 takes the measure mode B (step P12), and otherwise performs the normal rear wheel turning control (step P13).

Figure 10:
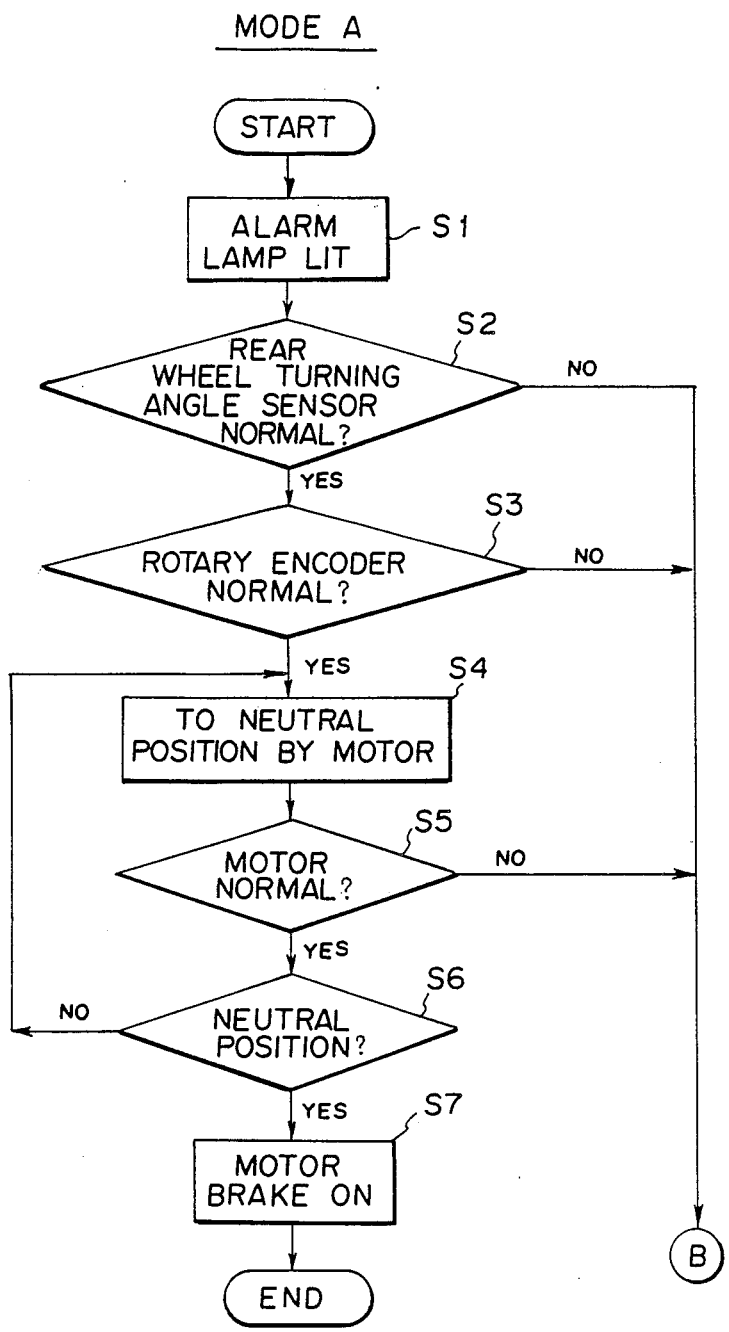

FIG. 10 shows in detail the measure mode A which is taken in the case of a first mode failure and is performed in step P5. The control unit 12 first lights the alarm lamp 128 to inform the driver that a failure has occurred (step S1). Then control unit 12 determines whether the rear wheel turning angle sensor 64 is normal (step S2) and whether the rotary encoder 62 is normal (step S3), thereby checking whether the turning of the rear wheels can be correctly controlled and the position of the rear wheels can be correctly detected. When it is determined that the rear wheel turning angle sensor 64 and the rotary encoder 62 are both normal, the control unit 12 commands the servomotor 8 to gradually return the rear wheel turning rod 4 to the neutral position (step S4). Then, the control unit 12 determines in the next step S5 whether the servomotor 8 is normal and in step S6 whether the rear wheel turning rod 4 has actually returned to the neutral position. When it is determined that the servomotor 8 is normal and the rear wheel turning rod 4 has actually returned to the neutral position, the control unit 12 actuates the brake 30, which locks the output shaft 8a of the servomotor 8 in a condition in which the rear wheel turning rod 4 is positioned in the neutral position. At this time, the clutch 10 is kept engaged, and accordingly, the rear wheel turning rod 4 is firmly held in the neutral position by the force of the spring 26 of the rear-wheel-neutralizing mechanism 6, the resistance of the servomotor 8 transmitted by way of the reduction train 28, and the locking effect of the brake 30.

On the other hand, when it is determined in step S2 that the rear wheel turning angle sensor is not normal, when it is determined in step S3 that the rotary encoder is not normal or when it is determined in step S5 that the servomotor 8 is not normal, the control unit 12 shifts its control to the measure mode B since, in this case, the rear wheel turning rod 4 cannot be correctly returned to the neutral position by the servomotor 8.

Figure 11:
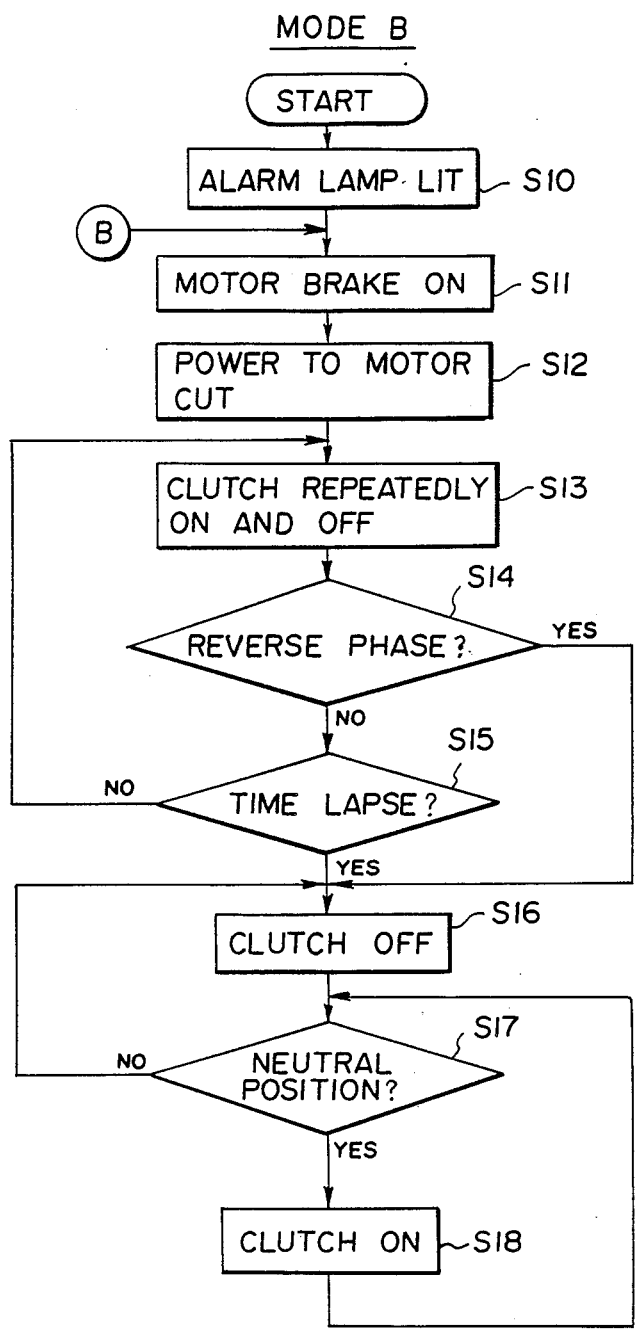

FIG. 11 shows in detail the measure mode B which is taken in the case of a second mode failure and is performed in step P13. The control unit 12 first lights the alarm lamp 128 to inform the driver that a failure has occurred (step S10). Then the control unit 12 actuates the brake 30 which locks the output shaft 8a of the servomotor 8 in step S11 and de-energizes the servomotor 8, thereby preventing an accident such as uncontrolled movement of the servomotor 8.

Then, in step S13, the control unit 12 repeatedly alternates between releasing and engaging the clutch 10 for a predetermined time interval so that the rear wheel turning rod 4 does not abruptly return to the neutral position under the force of the spring 26 of the rear-wheel-neutralizing mechanism 6 but returns gradually to the neutral position. Thus an abrupt change in the attitude of the vehicle body can be prevented. However, if the front wheels and the rear wheels have been turned in opposite directions (the reverse phase), the attitude of the vehicle body is not adversely affected by an abrupt return of the rear wheel turning rod 4 to the neutral position, and if the steering wheel is quickly turned in the reverse direction while the rear wheel turning rod 4 gradually returns to the neutral position, the rear wheels which should be turned in the same direction as the front wheels are actually turned in the opposite direction, thereby making the vehicle unstable. Accordingly, the control unit 12 determines in step S14 whether the front wheel turning angle $\theta F$ and the rear wheel turning angle $\theta F$ have been in the reverse phase. When it is determined in the step S14 that the front wheel turning angle $\theta F$ and the rear wheel turning angle $\theta F$ have been in the reverse phase, the control unit 12 immediately disengages the clutch 10 in step S16. Otherwise, the control unit 12 repeats steps S13 and S14 for a predetermined time interval, and when the predetermined time interval lapses (step S15), the control unit 12 disengages the clutch 10 (step S16). Although the time required for the rear wheel turning rod 4 to return to the neutral position is taken into account when the predetermined time interval is determined, the possibility that the steering wheel will be turned in the reverse direction while the rear wheel turning rod 4 is returning to the neutral position is increased if the time required for the rear wheel turning rod 4 to return to the neutral position is elongated due to external forces such as a cornering force. Accordingly, the clutch 10 is disengaged as soon as the predetermined time interval lapses irrespective of whether the rear wheel turning rod 4 has actually returned to the neutral position. That is, the predetermined time interval is set in order to minimize the occurrence of a situation where the steering wheel is turned in the reverse direction while the rear wheel turning rod 4 is returning to the neutral position so that the turning phase of the front wheels and the rear wheels which should be the same phase changes to the reverse phase.

After being disengaged in step S16, the clutch 10 is kept disengaged until it is determined that the rear wheel turning rod 4 has returned to the neutral position, and when it is determined that the rear wheel turning rod 4 has returned to the neutral position in step S17, the clutch 10 is engaged again in step S18. Thereafter, the clutch 10 is kept engaged, whereby, the rear wheel turning rod 4 is firmly held in the neutral position by the force of the spring 26 of the rear-wheel-neutralizing mechanism 6 and the locking effect of the brake 30.

In the case where the rear wheel turning angle sensor 64 fails, the clutch 10 is not engaged again in step S18 but kept disengaged so that the rear wheel turning rod 4 is not connected to the servomotor 8 in a position other than the neutral position, and accordingly, the rear wheel turning rod 4 is held in the neutral position under the force of the spring 26 of the rear-wheel-neutralizing mechanism 6.

Figure 12A:
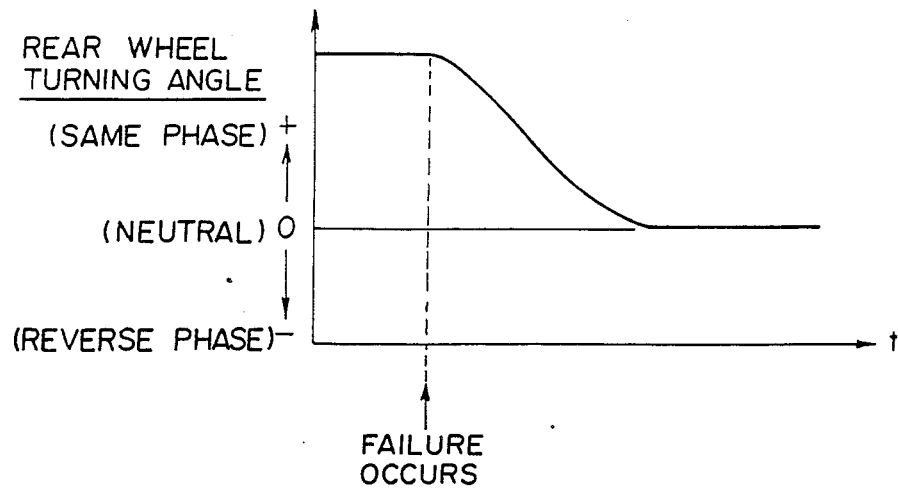
FIGS. 12A and 12B illustrate a modification of the control of the clutch in the embodiment.
Figure 12B:
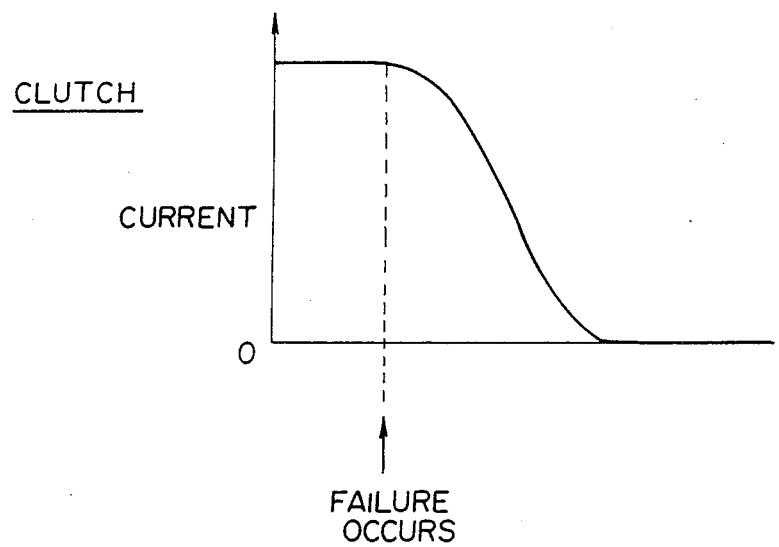

Though, in the embodiment described above, the rear wheel turning rod 4 gradually returns to the neutral position by the repeated and alternate release and engagement of the clutch 10 for a predetermined time interval, the rear wheel turning rod 4 may also gradually return to the neutral position by the gradual reduction of the current fed to the clutch 10 as shown in FIG. 12A and 12B. When the current fed to the clutch 10 is gradually reduced, the clutch 10 gradually slips so as to disengage the gear train 28a from the output shaft 8a of the servomotor 8.

When the rear wheel turning rod 4 gradually returns to the neutral position by virtue of the slipping of the clutch 10, a powder clutch may be used as the clutch 10 so that the rear wheel turning rod 4 gradually returns to the neutral position by the gradual reduction of the magnetic force applied thereto.

Figure 13:
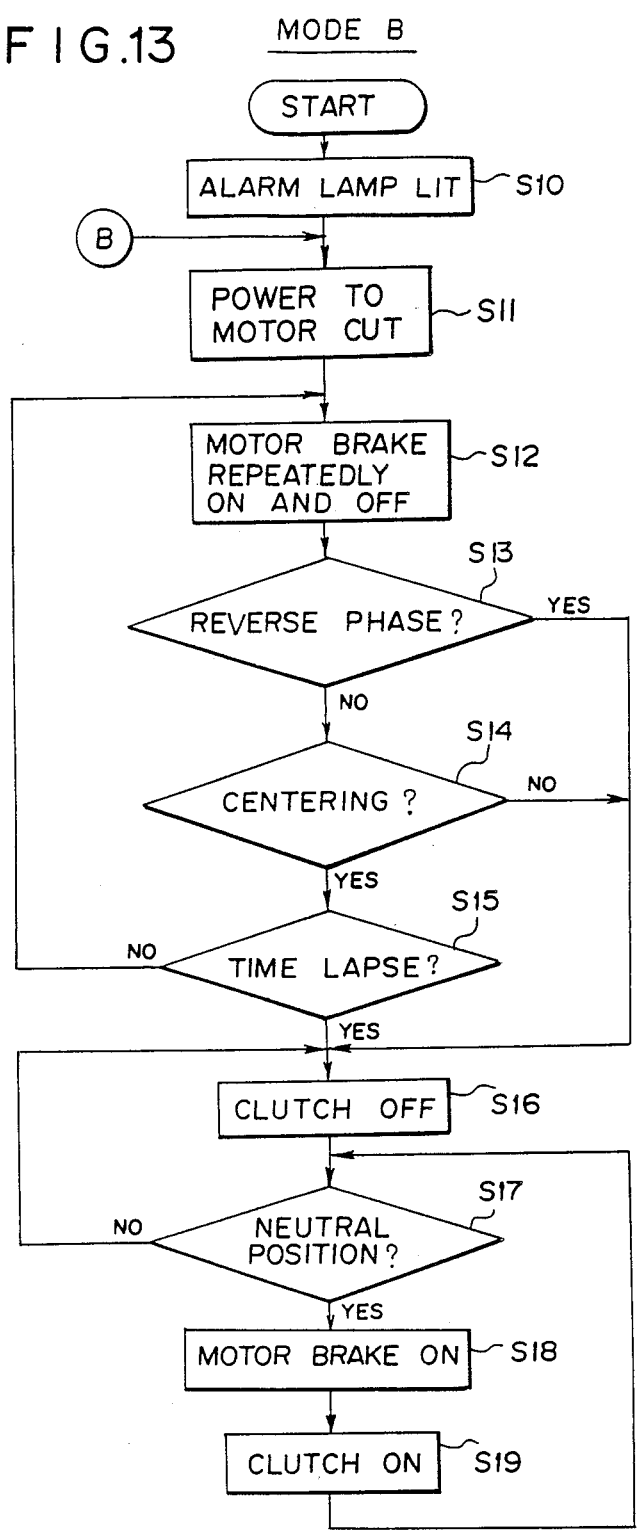
FIG. 13 is a flow chart similar to the one in FIG. 11 but for illustrating a modification of the measure mode B.
Figure 14A:
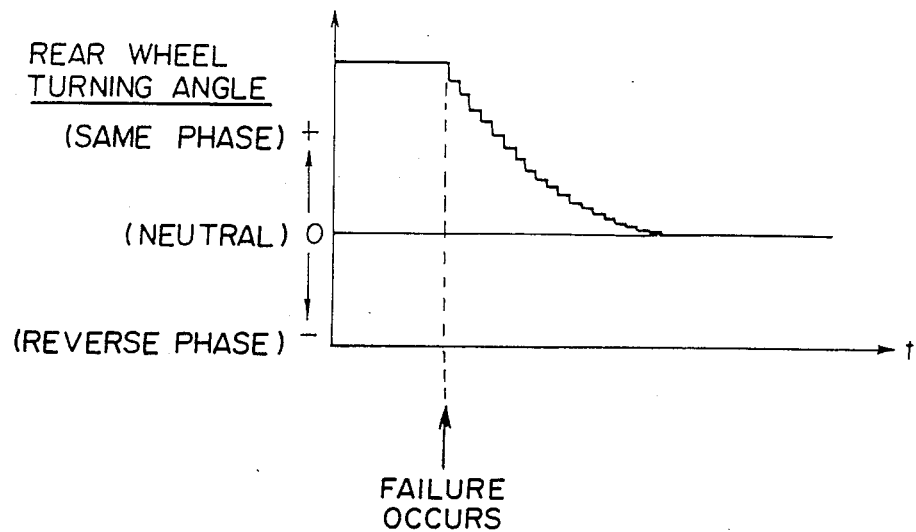
FIGS. 14A and 14B illustrate the control of the brake in the modification shown in FIG. 13, FIGS. 15A and 14B illustrate a modification of the control made on the brake in the modification shown in FIG. 13, FIGS. 16A and 16B illustrate the control of the servomotor in another modification of the measure mode B.
Figure 14B:
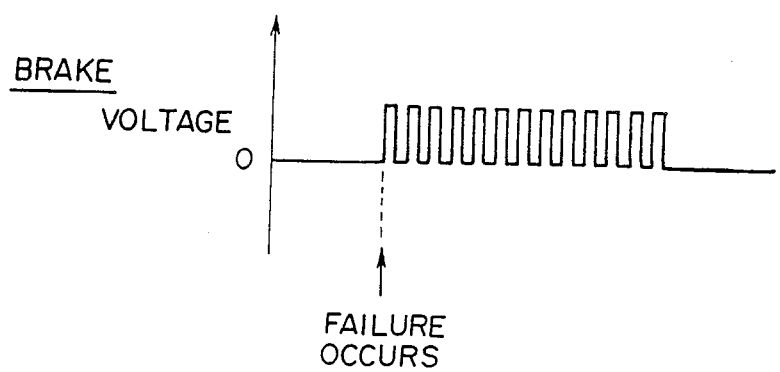

FIG. 13 is a flow chart illustrating a modification of the measure mode B. In this modification, the rear wheel turning rod 4 gradually returns to the neutral position by the repeated and alternate application and release of the brake 30 for a predetermined time interval as shown in FIGS. 14A and 14B.

As shown in FIG. 13, the control unit 12 first lights the alarm lamp 128 to inform the driver that a failure has occurred (step S10). Then the control unit 12 de-energizes the servomotor 8 in step S11, thereby preventing an accident such as uncontrolled movement of the servomotor 8.

Then, in step S12, the control unit 12 repeatedly alternates between releasing and applying the brake 30 for a predetermined time interval so that the rear wheel turning rod 4 does not abruptly return to the neutral position under the force of the spring 26 of the rear-wheel-neutralizing mechanism 6 but gradually returns to the neutral position. Thus an abrupt change in the attitude of the vehicle body can be prevented. However, if the front wheels and the rear wheels have been turned in opposite directions (the reverse phase), the attitude of the vehicle body is not adversely affected by an abrupt return of the rear wheel turning rod 4 to the neutral position, and if the steering wheel is quickly turned in the reverse direction while the rear wheel turning rod 4 gradually returns to the neutral position, the rear wheels which should be turned in the same direction as the front wheels are actually turned in the opposite direction, thereby making the vehicle unstable. Accordingly, the control unit 12 determines in step S13 whether the front wheel turning angle $\theta F$ and the rear wheel turning angle $\theta F$ have been in the reverse phase.

When it is determined in step S14 that the front wheel turning angle $\theta F$ and the rear wheel turning angle $\theta F$ have been in the reverse phase, the control unit 12 immediately disengages the clutch 10 in step S16. Otherwise, the control unit 12 repeats steps S12, S13 and S14 for a predetermined time interval, that is, the operation by which the rear wheel turning rod 4 gradually returns to the neutral position is continued. In the step S14, the control unit 12 determines whether the rear wheel turning rod 4 is centering, that is, whether the rear wheel turning rod 4 is moving toward the neutral position. When it is determined in the step S14 that the rear wheel turning rod 4 is not centering, the control unit 12 disengages the clutch 10 in step S16. On the other hand, when it is determined in the step S14 that the rear wheel turning rod 4 is centering, the control unit 12 repeats the steps S12, S13 and S14 until the predetermined time interval lapses and when the predetermined time interval lapses (step S15), the control unit 12 disengages the clutch 10 (step S16).

After being disengaged in step S16, the clutch 10 is kept disengaged until it is determined in step S17 that the rear wheel turning rod 4 has returned to the neutral position. When it is determined that the rear wheel turning rod 4 has returned to the neutral position in the step S17, the brake 30 is applied again in step S18 and the clutch 10 is engaged again in step S19. Thereafter, the brake 30 is kept applied and the clutch 10 is kept engaged, whereby, the rear wheel turning rod 4 is firmly held in the neutral position by the force of the spring 26 of the rear-wheel-neutralizing mechanism 6 and the locking effect of the brake 30.

Figure 15A:
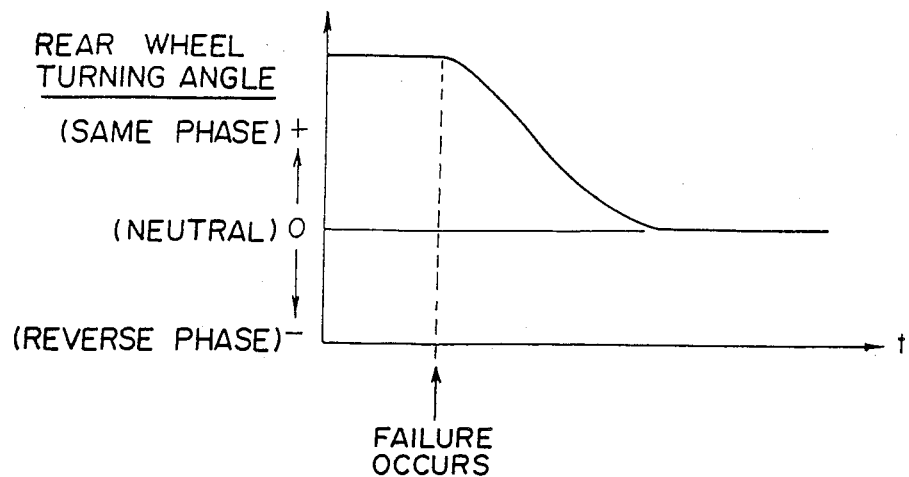
Figure 15B:
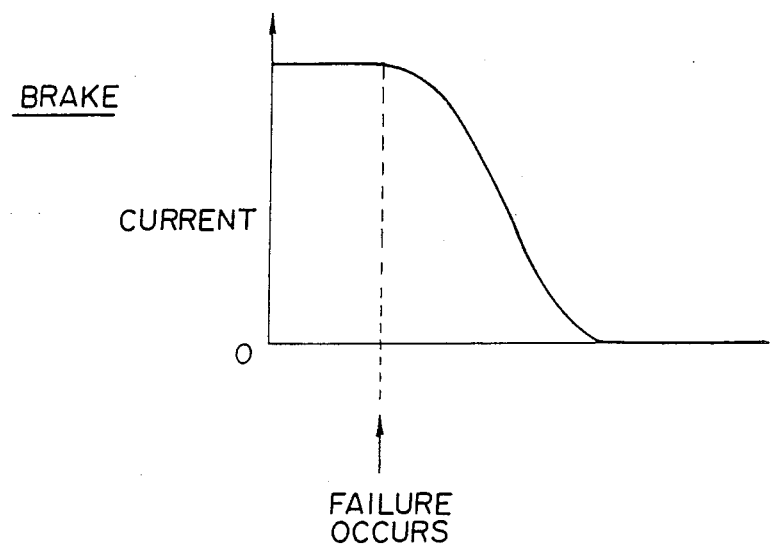

Though, in the modification described above, the rear wheel turning rod 4 gradually returns to the neutral position as the brake 30 is repeatedly applied and released over a predetermined time interval, the rear wheel turning rod 4 may gradually return to the neutral position by the gradual reduction of the current fed to the brake 30 as shown in FIGS. 15A and 15B so that the locking force of the brake 30 against the output shaft 8a of the servomotor 8 is gradually weakened.

The rear wheel turning rod 4 will also gradually return to the neutral position by the de-energization of the servomotor 8 simultaneously with the occurrence of a failure as shown in FIG. 16A and 16B. That is, when the servomotor 8 is de-energized simultaneously with occurrence of a failure, the inertia force of the servomotor 8 and the reduction train 28 resists the force of the spring 26 and causes the rear wheel turning rod 4 to gradually return to the neutral position. The resistance against the spring 26 is increased as the inertia force of the servomotor 8 and the reduction train 28 increases, and the inertia force of the servomotor 8 and the reduction train 28 can be increased by shaping the gears of the gear train 28a of the reduction train 28 such that they have a larger moment of inertia of area.

FIG. 17 is a flow chart illustrating another modification of the measure mode B in which the rear wheel turning rod 4 gradually returns to the neutral position by virtue of the inertia force of the reduction train 28 and the servomotor 8.

The resistance of the inertia force of the servomotor 8 and the reduction train 28 against the spring 26 of the rear-wheel-neutralizing mechanism 6 can be enhanced by a regenerative braking effect of the motor when the servomotor 8 is provided with a closed circuit forming means which forms a closed circuit including the servomotor 8 in response to the de-energization of the servomotor 8 as shown in FIG. 18.

In FIG. 18, the motor driving circuit 112 is provided with four transistors 112A to 112D connected to the servomotor 8. When the transistors 112A and 112D are turned on and the relay switch 122 is closed, the servomotor 8 rotates in one direction, and when the transistors 112B and 112C are turned on and the relay switch 122 is closed, the servomotor 8 rotates in the other direction. Monitor circuits 112a to 112d connected between the collectors of the respective transistors 112A to 112D and the microprocessor 104 watch whether the servomotor 8 is operating correctly. The motor driving circuit 112 is arranged so that both the transistors 112C and 112D are turned on to form a closed circuit which includes the servomotor 8 when the servomotor 8 is de-energized, that is, when the relay switch 122 is opened.

When the servomotor 8 rotates in one direction by an external force acting on the output shaft 8a while the closed circuit is formed, the servomotor 8 generates a regenerative braking torque in the other direction. The regenerative braking torque increases with the increase in the rotating speed of the servomotor 8. Accordingly, the servomotor 8 rotates keeping a balance with the external force acting on the output shaft 8a. The external force acting on the output shaft 8a when the servomotor 8 is de-energized is the force of the spring 26 of the rear-wheel-neutralizing mechanism 6. Though the force of the spring 26 increases with an increase in displacement of the rear wheel turning rod 4 from the neutral position, the rear wheel turning rod 4 will return to the neutral position at substantially the same speed irrespective of the displacement from the neutral position since the regenerative braking torque increases as the rotating speed of the servomotor 8 increases.

We claim:

1. A rear wheel turning system comprising a rear wheel turning means which is connected to the rear wheels of the vehicle and is adapted to be displaced so as to turn the rear wheels, an electric motor which is operatively connected to the rear wheel turning means and the steering wheel so as to displace the rear wheel turning means, which turns the rear wheels in response to the operation of the steering wheel, a rear-wheel-neutralizing means which urges the rear wheel turning means to the neutral position in which the rear wheels are held in the straight-ahead position, a clutch means which is interposed between the electric motor and the rear wheel turning means and is adapted to disconnect the latter from the former to permit the latter to return to the neutral position under the force of the rear-wheel-neutralizing means, and a returning speed limiting means which lowers the returning speed at which the rear wheel turning means returns to the neutral position,
   wherein said returning speed limiting means lowers said returning speed by controlling said clutch means, and said returning speed limiting means lowers the returning speed by repeatedly alternating between disengaging and engaging the clutch.

2. A rear wheel turning system as defined in claim 1 further comprising a failure detecting means which detects occurrence of a failure in the control system thereof, and a clutch control means which disengages the clutch means, which disconnects the rear wheel turning means from the electric motor when a failure occurs in the control system.

3. A rear wheel turning system as defined in claim 2 in which said failure detecting means detects that the electric motor becomes unable to turn the rear wheels.

4. A rear wheel turning system as defined in claim 1 further comprising a failure detecting means which detects the occurrence of failure in the control system thereof, and a measure means which takes measures against the failure detected by the failure detecting means.

5. A rear wheel turning system as defined in claim 4 in which said measure means comprises a first measure means which causes the electric motor to return the rear wheel turning means to the neutral position and a second measure means which disengages the clutch means to permit the rear-wheel-neutralizing means to return the rear wheel, turning means to the neutral position.

6. A rear wheel turning system as defined in claim 1 in which said rear wheel turning means includes a rear wheel turning rod which is displaced so as to turn the the rear wheels and said rear-wheel-neutralizing means comprise a spring member which urges the rear wheel turning rod to the neutral position.

7. A rear wheel turning system as defined in claim 6 in which said spring member comprises a compression spring which is supported between a pair of spring retainers and which has a spring force which can overcome the side force acting on the rear wheels during cornering of the vehicle when the rear wheels are in a straight-ahead position.

8. A rear wheel turning system as defined in claim 1 in which an electromagnetic brake means which brakes the rotation of the output shaft of the electric motor is provided between the output shaft of the electric motor and the clutch means.

9. A rear wheel turning system comprising a rear wheel turning means which is connected to the rear wheels of the vehicle and is adapted to be displaced so as to turn the rear wheels, an electric motor which is operatively connected to the rear wheel turning means and the steering wheel so as to displace the rear wheel turning means, which turns the rear wheels in response to the operation of the steering wheel, a rear-wheel-neutralizing means which urges the rear wheel turning means to the neutral position in which the rear wheels are held in the straight-ahead position, a clutch means which is interposed between the electric motor and the rear wheel turning means and is adapted to disconnect the latter from the former to permit the latter to return to the neutral position under the force of the rear-wheel-neutralizing means, and a returning speed limiting means which lowers the returning speed at which the rear wheel turning means returns to the neutral position,
    wherein said returning speed limiting means lowers said returning speed by controlling said clutch means by gradually weakening the connecting force of the clutch means with which the clutch means operatively connects the electric motor to the rear wheel turning means.

10. A rear wheel turning system as defined in claim 9 in which said returning speed limiting means lowers the returning speed by gradually reducing the driving current of the clutch means.

11. A rear wheel turning system as defined in claim 9 further comprising a failure detecting means which detects occurrence of a failure in the control system thereof, and a clutch control means which disengages the clutch means, which disconnects the rear wheel turning means from the electric motor when a failure occurs in the control system.

12. A rear wheel turning system as defined in claim 11 in which said failure detecting means detects that the electric motor becomes unable to turn the rear wheels.

13. A rear wheel turning system as defined in claim 9 further comprising a failure detecting means which detects the occurrence of failure in the control system thereof, and a measure means which takes measures against the failure detected by the failure detecting means.

14. A rear wheel turning system as defined inc a claim 13 in which said measure means comprise a first measure means which causes the electric motor to return the rear wheel turning means to the neutral position and a second measure means which disengages the clutch means to permit the rear-wheel-neutralizing means to return the rear wheel turning means to the neutral position.

15. A rear wheel turning system as defined in claim 9 in which said rear wheel turning means includes a rear wheel turning rod which is displaced so as to turn the rear wheels and said rear-wheel-neutralizing means comprise a spring member which urges the rear wheel turning rod to the neutral position.

16. A rear wheel turning system as defined in claim 15 in which said spring member comprises a compression spring which is supported between a pair of spring retainers and which has a spring force which can overcome the side force acting on the rear wheels during cornering of the vehicle when the rear wheels are in a straight-ahead position.

17. A rear wheel system as defined in claim 9 in which an electromagnetic brake means which brakes the rotation of the output shaft of the electric motor is provided between the output shaft of the electric motor and the clutch means.

18. A rear wheel turning system comprising a rear wheel turning means which is connected to the rear wheels of the vehicle and is adapted to be displaced so as to turn the rear wheels, an electric motor which is operatively connected to the rear wheel turning means and the steering wheel so as to displace the rear wheel turning means, which turns the rear wheels in response to the operation of the steering wheel, a rear-wheel-neutralizing means which urges the rear wheel turning are held in the straight-ahead position, a clutch means which is interposed between the electric motor and the rear wheel turning means and is adapted to disconnect the latter from the former to permit the latter to return to the neutral position under the force of the rear-wheel-neutralizing means, a returning speed limiting means which lowers the returning speed at which the rear wheel turning means returns to the neutral position, and a brake means which holds the rear wheel turning means in a predetermined displaced position, wherein said returning speed limiting means lowers the returning speed by controlling the brake means.

19. A rear wheel turning system as defined in claim 18 in which said returning speed limiting means lowers the returning speed by repeatedly alternating between releasing and applying the brake means.

20. A rear wheel turning system as defined in claim 18 in which said returning speed limiting means lowers the returning speed by gradually reducing the holding force of the brake means.

21. A rear wheel turning system as defined in claim 18 further comprising a failure detecting means which detects occurrence of a failure in the control system thereof, and a clutch control means which disengages the clutch means, which disconnects the rear wheel turning means from the electric motor when a failure occurs in the control system.

22. A rear wheel turning system as defined in claim 21 in which said failure detecting means detects that the electric motor becomes unable to turn the rear wheels.

23. A rear wheel turning system as defined in claim 18 further comprising a failure detecting means which detects the occurrence of failure in the control system thereof, and a measure means which takes measures against the failure detected by the failure detecting means.

24. A rear wheel turning system as defined in claim 33 in which said measure means comprises a first measure means which causes the electric motor to return the rear wheel turning means to the neutral position and a second measured means which disengages the clutch means to permit the rear-wheel-neutralizing means to return the rear wheel turning means to the neutral position.

25. A rear wheel turning system as defined in claim 18 in which said rear wheel turning means includes a rear wheel turning rod which is displaced so as to turn the rear wheels and said rear-wheel-neutralizing means comprise a spring member which urges the rear wheel turning rod to the neutral position.

26. A rear wheel turning system as defined in claim 25 in which said spring member comprises a compression spring which is supported between a pair of spring retainers and which has a spring force which can overcome the side force acting on the rear wheels during cornering of the vehicle when the rear wheels are in a straight-ahead position.

27. A rear wheel turning system as defined in claim 18 in which an electromagnetic brake means which brakes the rotation of the output shaft of the electric motor is provided between the output shaft of the electric motor and the clutch means.

28. A rear wheel turning system comprising a rear wheel turning means which is connected to the rear wheels of the vehicle and is adapted to be displaced so as to turn the rear wheels, an electric motor which is operatively connected to the rear wheel turning means and the steering wheel so as to displace the rear wheel turning means, which turns the rear wheels in response to the operation of the steering wheel, a rear-wheel-neutralizing means which urges the rear wheel turning means to the neutral position in which the rear wheels are held in the straight-ahead position, a clutch means which is interposed between the electric motor and the rear wheel turning means and is adapted to disconnect the latter from the former to permit the latter to return to the neutral position under the force of the rear-wheel-neutralizing means, and a returning speed limiting means which lowers the returning speed at which the rear wheel turning means returns to the neutral position, wherein said returning speed limiting means comprises a de-energizing means which cuts off the power supplied to the electric motor when a predetermined failure occurs in the system and a connecting mechanism which connects the electric motor to the rear wheel turning means so that the electric motor rotates in the reverse direction under the force of the rear-wheel-neutralizing means when the power supplied to the electric motor is cut off.

29. A rear wheel turning system as defined in claim 18 in which said returning speed limiting means is provided with a closed circuit forming means which forms a closed circuit including the electric motor when the power supplied to the electric motor is cut off, the closed circuit being adapted to generate a regenerative braking torque when the electric motor rotates under the force of the rear-wheel-neutralizing means.

30. A rear wheel turning system as defined in claim 28 further comprising a failure detecting means which detects occurrence of a failure in the control system thereof, and a clutch control means which disengages the clutch means, which disconnects the rear wheel turning means from the electric motor when a failure occurs in the control system.

31. A rear wheel turning system as defined in claim 30 in which said failure detecting means detects that the electric motor becomes unable to turn the rear wheels.

32. A rear wheel turning system as defined in claim 28 further comprising a failure detecting means which detects the occurrence of failure in the control system thereof, and a measure means which takes measures against the failure detected by the failure detecting means.

33. A rear wheel turning system as defined in claim 32 in which said measure means comprises a first measure means which causes the electric motor to return the rear wheel turning means to the neutral position and a second measure means which disengages the clutch means to permit the rear-wheel-neutralizing means to return the rear wheel turning means to the neutral position.

34. A rear wheel turning system as defined in claim 28 in which said rear wheel turning means includes a rear wheel turning rod which is displaced so as to turn the rear wheels and said rear-wheel-neutralizing means comprise a spring member which urges the rear wheel turning rod to the neutral position.

35. A rear wheel turning system as defined in claim 34 in which said spring member comprises a compression spring which is supported between a pair of spring retainers and which has a spring force which can overcome the side force acting on the rear wheels during cornering of the vehicle when the rear wheels are in a straight-ahead position.

36. A rear wheel turning system as defined in claim 28 in which an electromagnetic brake means which brakes the rotation of the output shaft of the electric motor is provided between the output shaft of the electric motor and the clutch means.

* * * * *